Dec. 12, 1961  A. J. BARBIAUX  3,012,794
HAND SLED
Filed June 27, 1960
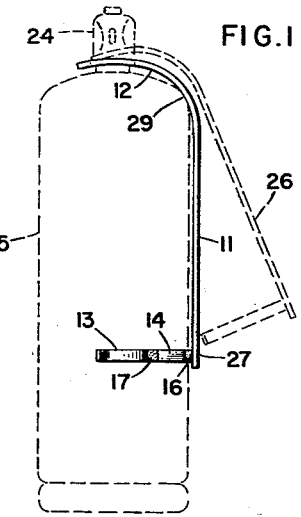
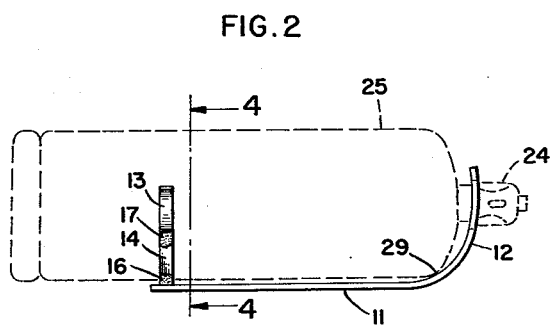
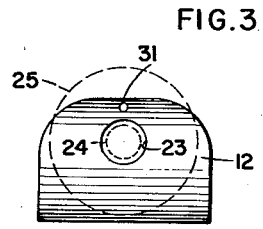
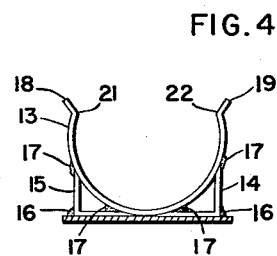
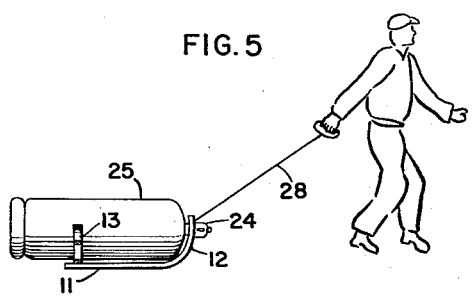
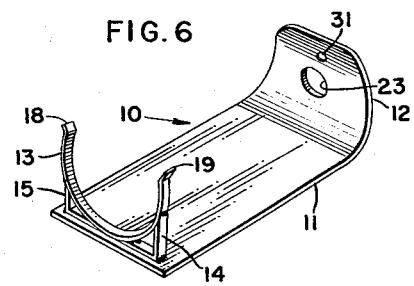
*INVENTOR*
ANTHONY J. BARBIAUX
BY *Stanley E Binish*
*ATTORNEY*

United States Patent Office 3,012,794
Patented Dec. 12, 1961

3,012,794
HAND SLED
Anthony J. Barbiaux, P.O. Box 7, Luxemberg, Wis.
Filed June 27, 1960, Ser. No. 38,993
3 Claims. (Cl. 280—19)

This invention relates generally to hand sleds, and more particularly to a sled adapted for conveying a gas bottle.

The purpose of this invention is to facilitate the delivery and handling of gas bottles. Gas for cooking is now being used quite extensively in the rural areas. Such gas is contained and delivered in huge metal bottles about eighteen inches in diameter and about fifty inches in height, which are too heavy for manual handling. During the summer months the gas bottles are conveyed from a delivery truck to an installation station outside a kitchen by means of a wheeled hand truck rolled on the bare ground, driveway, lawn, or the like. In the winter, under conditions of snow, the wheeled hand trucks are obviously quite useless. The specific purpose of this invention is to provide a sled adapted to carry a gas bottle for conveyance over snow.

An object of this invention is the provision of a sled adapted for conveying gas bottles over snow.

Another object is to provide a sled adapted to fit onto a gas bottle when the gas bottle is in an upright position.

Still another object of this invention is the provision of a sled adapted to be assembled on a gas bottle when the gas bottle is in an upright position, and whereby said assembly can be pushed-over or lowered to an operative conveying position on the snow covered ground.

Yet another object is to provide a sled having means on the front end thereof for receivably engaging the cap of a gas bottle.

A further object is to provide a sled having means for releasably engaging the body of a gas bottle thereon.

Still a further object of this invention is the provision of the combination of a sled and gas bottle wherein the gas bottle becomes part of the sled conveyance when the sled is being used to transport the bottle.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side elevation view of the present invention showing an upright gas bottle having a sled fixed thereunto;

FIG. 2 is a side elevation view of a sled operatively supporting a gas bottle, the upright arrangement of FIG. 1 having been lowered to an operative prone position as shown;

FIG. 3 is a front elevation view of FIG. 2;

FIG. 4 is a cross-section view taken on line 4—4 of FIG. 2;

FIG. 5 is a side elevation view, of the gas bottle on the sled, in an operative prone position, illustrating a man pulling the sled and bottle arrangement through means of a draw bar;

FIG. 6 is a perspective view of the sled; and

FIG. 7 is a front elevation view of a gas bottle cap, per se, showing vent openings therein.

Referring now to the drawings, wherein like reference characters designate like or corresponding parts throughout the several views, there is shown a flat bottomed sled comprising an upturned sheet or plate of metal or other suitable material, generally indicated at 10, having a flat body portion 11 and an upturned forward end portion 12. It is preferred, though not necessary, that the width of the sled be a little greater than the diameter of the bottle to be conveyed; and it is preferred, though not necessary that the length of the sled be approximately two-thirds the length of said bottle. The thickness or gauge of the plate should be of a measure suitable for the intended purpose. The upturned forward end portion 12 curves approximately ninety degrees, whereby the terminal portion thereof is substantially at a right angle to the flat body portion 11. The flat deck 11 is preferably rectangular in shape.

A spring C-clamp 13, having its open end disposed upwardly, is welded transversely across the rear end portion of the plate body 11. Specifically, the C-clamp is disposed substantially symmetrically about a line normal to plate 11 and passing through the base of the C-clamp.

Right angle brackets 14 and 15 are welded, as at 16 and 17, to the plate 11 and the sides of the C-clamp, respectively, to buttress the C-clamp, see FIG. 4.

C-clamp 13 is substantially of a circular arc configuration extending through approximately two hundred twenty degrees of curvature, though not limited thereto, having out-turned terminal lip guide portions 18 and 19, see FIG. 4.

The junction of said lip guides 18 and 19 with the sides of the C-clamp form working edges 21 and 22, respectively.

The curvature of the C-clamp corresponds substantially to the cross sectional curvature of the gas bottle intended to be received in said C-clamp; however, the open end portions of the C-clamp are drawn slightly inwardly to provide a clamping tension on the gas bottle.

An opening 23, adapted to receive loosely therethrough the cap 24 of a gas bottle 25, see FIG. 3, is provided in the upturned forward end portion 12 for reasons hereinafter described. Said opening 12 is axially aligned with the axis of C-clamp 13. Said cap 24 is provided with the usual apertures or vents 20, see FIG. 7, adapted for the engagement therewith of a hook-end draw bar hereinafter described.

*Operation.*—A gas bottle 25, desired to be unloaded and conveyed from a truck to an installation station outside a kitchen, is first removed from the truck and disposed, on the snow covered ground, in a vertical upstanding position, see FIG. 1.

The sled 10 is held above the gas bottle, and then lowered to the dotted line position 26, on the gas bottle, the opening 23 of the sled receiving the bottle cap 24 therethrough, and the lip guides 18 and 19 engaging the bottle sides, thereby properly positioning the sled relative to the bottle and hanging the sled obliquely thereon, preparatory to pushing the sled onto the bottle.

A pushing force is then applied to the lower portion of the sled, thereby fitting the sled onto the gas bottle as indicated by the solid line position 27. As the sled is pushed onto the bottle, the sled is guided thereon by lip guides 18 and 19, the spring C-clamp yielding and spreading in the meantime, until the working edges 21 and 22 pass over the widest portion of the bottle, after which the inner periphery of the C-clamp engages the outer periphery of the bottle to tensionally and snugly embrace the bottle thereby.

To operatively dispose the sled and bottle assembly on the snow covered ground, the assembly is tilted and lowered until the sled operatively engages and rests on the snow covered ground, as shown in FIG. 2. It is to be noted that during the tilting and lowering operation the sled is securely held on the bottle through means of the cap engaging opening 23 and the spring C-clamp 13, thereby preventing a disengagement of the sled from the bottle during such tilting operation, and otherwise maintaining an assembled relationship of the bottle and the sled for operative disposition on the snow.

To transport the bottle on the sled, the operator engages the hook end of a draw bar 28 with one of several openings or vents 20 in the projecting conventional bottle cap 24 and pulls thereon as shown in FIG. 5. The lower shoulder portion of the bottle engages the curved end of the sled, such as indicated at 29, and the sled is pulled forward thereby. The cap 24 is threadedly engaged on said bottle.

In the alternative, the operator may engage the hook end of draw bar 28 in a separate aperture 31 in the forward curved portion 12 of the sled, thereby pulling directly on the sled.

When the installation station is reached, such as at a kitchen, the draw bar 28 is unhooked from the cap 24, and the bottle is raised to an upstanding position, with the sled still attached thereto. The operator then pulls on the lower portion of the sled to disengage the C-clamp from the bottle; and finally, he lifts the sled vertically upwardly, disengaging the cap from the sled opening 20, thereby removing the sled from the bottle, and completing the cycle of operations.

Some characteristic features of this invention are the provision of a sled having an opening in the curved front end thereof adapted to receivably engage the cap of a gas bottle therethrough; the provision of a sled having a spring C-clamp thereon for embracing a gas bottle; and the combination of a sled and gas bottle releasably mounted thereon.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. A hand sled, comprising: an elongated plate body having an upturned front end portion; a spring C-clamp fixed on said plate body, said C-clamp being disposed transversely of the longitudinal axis of said plate body, and the open end of said C-clamp being disposed upwardly, said C-clamp being adapted to tensionally embrace a gas bottle; and an opening in said upturned front end portion adapted to receive the cap of a gas bottle engageably therein, said opening being substantially axially aligned with said C-clamp.

2. The combination of a hand sled and bottle, comprising: hand sled means comprising an elongated plate body having an upturned front end portion; a spring C-clamp fixed on said plate body, said C-clamp being disposed transversely of the longitudinal axis of said plate body, and the open end of said C-clamp being disposed upwardly; an opening in said upturned front end portion, said opening being substantially axially aligned with said C-clamp; and a gas bottle embraced in said C-clamp and having its cap end received in said opening.

3. A hand sled for conveying a gas bottle, comprising: sled means having a plate deck and an upturned front end portion; a C-clamp fixed on said deck, said C-clamp being disposed transversely of the longitudinal axis of said deck, and the open end of said C-clamp being disposed upwardly, said C-clamp being adapted to receive a gas bottle; and an opening in said upturned front end portion adapted to engageably receive the cap of a gas bottle therein, said opening being substantially axially aligned with said C-clamp.

References Cited in the file of this patent

UNITED STATES PATENTS

| 2,132,744 | McCraw | Oct. 11, 1938 |
| 2,219,905 | Prickman | Oct. 29, 1940 |
| 2,308,699 | Longenecker | Jan. 19, 1943 |
| 2,598,682 | Giovannoni | June 3, 1952 |

FOREIGN PATENTS

| 15,294 of 1911 | Great Britain | Oct. 5, 1911 |
| 807,497 | Germany | June 28, 1951 |